United States Patent [19]

LeMay

[11] Patent Number: 5,066,684
[45] Date of Patent: Nov. 19, 1991

[54] LOW DENSITY MICROCELLULAR FOAMS

[75] Inventor: James D. LeMay, Castro Valley, Calif.

[73] Assignee: The United States of America as represented by the United States Department of Energy, Washington, D.C.

[21] Appl. No.: 535,007

[22] Filed: Jun. 8, 1990

[51] Int. Cl.$^5$ .............................. C08J 9/08; C08J 9/28
[52] U.S. Cl. ........................................ 521/64; 521/97; 521/130; 521/178
[58] Field of Search ..................... 521/64, 97, 130, 178

[56] References Cited

U.S. PATENT DOCUMENTS

| | | | |
|---|---|---|---|
| 3,649,572 | 3/1972 | Hahston et al. | 260/2.5 |
| 3,784,487 | 1/1974 | Franck et al. | 260/2.5 F |
| 4,235,974 | 11/1980 | Blount | 521/99 |
| 4,281,069 | 7/1981 | Harris | 521/123 |
| 4,693,938 | 9/1987 | Darling | 428/403 |
| 4,698,370 | 10/1987 | Saeki et al. | 521/128 |
| 4,797,425 | 1/1989 | Kishima et al. | 521/64 |

FOREIGN PATENT DOCUMENTS 0060138 9/1982 European Pat. Off. .

Primary Examiner—Morton Foelak
Attorney, Agent, or Firm—Paul R. Martin; L. E. Carnahan; William R. Moser

[57] ABSTRACT

Disclosed is a process of producing microcellular foam which comprises the steps of:
(a) selecting a multifunctional epoxy oligomer resin;
(b) mixing said epoxy resin with a non-reactive diluent to form a resin-diluent mixture;
(c) forming a diluent containing cross-linked epoxy gel from said resin-diluent mixture;
(d) replacing said diluent with a solvent therefore;
(e) replacing said solvent with liquid carbon dioxide; and
(f) vaporizing off said liquid carbon dioxide under supercritical conditions, whereby a foam having a density in the range of 35–150 mg/cc and cell diameters less than about 1 μm is produced.

Also disclosed are the foams produced by the process.

13 Claims, 5 Drawing Sheets

LOW DENSITY MICROCELLULAR FOAMS

The United States Government has rights in this invention pursuant to Contract No. W-7405-ENG-48 between the U.S. Department of Energy and the University of California, for the operation of Lawrence Livermore National Laboratory.

FIELD OF THE INVENTION

This invention relates to low density foams, and to a process for making them. More particularly, it relates to low density cross-linked epoxy foams having cell sizes of no more than about 1 μm in diameter and densities less than about 50 mg/cm$^3$. The invention also relates to fuel containers made from the foams.

BACKGROUND OF THE INVENTION

The process that generates the sun's energy is sustained by nuclear fusion. Replicating this process in a controlled environment would yield an inexhaustible supply of energy, a commodity which is in relatively short supply presently. For example, at the present rate of consumption, it is estimated by some that the world's supply of oil will be exhausted within 100 years or less.

There is presently underway in the United States, and various foreign countries, research efforts directed to processes for generating energy by controlled sustained nuclear fusion. It has been suggested that one way to achieve such nuclear fusion is to bombard a target fuel cell, or capsule, usually containing a liquid deuterium-tritium (DT) fuel mixture, with a laser beam. The laser beam, at sufficiently high energy, would cause a plasma envelope to form on the surface of the fuel mixture which would drive the capsule inward (imploding) to heat the fuel. Under appropriate conditions, the compressed fuel will ignite in a thermonuclear burn, causing the fusion of deuterium and tritium to produce helium and give off more energy than that expended to ignite the fuel.

The physics of laser inertial confinement fusion (ICF), as this process is called, imposes several requirements on the design and material characteristics of the fuel and capsule that comprise the target of the laser beam.

By appropriate calculations and experimental efforts, it has been determined that optimum results will be obtained when a dense liquid or solid fuel is used, and the capsule containing fuel is shaped like a ball of near perfect spherical symmetry having a hollow core. The hollow core provides a vapor region which serves as a spark plug when the fuel and vapor is compressed by the implosion caused by the laser beam.

Such a capsule is described in U.S. Pat. No. 4,693,938.

In addition to the requirements of spherical configuration, the design of one embodiment also requires that the capsule containing the fuel be porous, low in density and made with materials having a low atomic number (i.e., as near to C, or H as possible). A capsule made of low density foam is mostly empty space. If porous or open celled, it will act as a wick, soaking up fuel, thereby enabling the maximum amount of fuel to fill the available space.

When liquid fuel is charged to the foam capsule, it becomes wet. For a wetted foam capsule, the internal structure must be sufficiently strong and the cells sufficiently small and uniform that capillary forces will support a liquid column about the height of the capsule diameter under the maximum acceleration that the capsule will undergo during use.

By calculation, it has been determined that the foam cells should have diameters of no more than about 1 μm and be open, that is, linked to each other by passageways, and that the density of the foam be less than about 50 mg/cm$^3$.

THE PRIOR ART

Foams made from polymeric materials are well known in the art. Foams made from polyurethanes, phenolics, polyvinyl chloride, polyolefins, and polystyrene are described in *Plastic Foams*, Vol. II, Benning, John Wiley & Sons, 1969.

U.S. Pat. No. 4,797,425 discloses a method of producing a porous material having open pores which comprises the steps of preparing an emulsion slurry of a bisphenol-type epoxy resin, a polyamine hardener, a filler and water, casting the emulsion slurry in a water-impermeable mold, and hardening the slurry while it contains water. Thereafter, the hardened mass is put into a drier to evaporate the water contained therein, whereby a porous molded product having open pores is produced.

U.S. Pat. No. 4,235,974 relates to the production of epoxy cellular solid products by reacting an epoxy compound with an organic polyamine to produce an epoxy prepolymer. The epoxy prepolymer expands when heated to produce an epoxy cellular solid, without the addition of a blowing agent.

U.S. Pat. No. 4,698,370 discloses a phenolic resin composite foam which is prepared by heating and foaming a novolak phenolic resin, a blowing agent, a blowing auxiliary compound and inorganic foamed particles. It is stated that foam produced has a high compressive strength, high foaming and rapid curing rates, a low water absorption and a minimum of friability.

U.S. Pat. No. 3,649,572 relates to epoxy resin foams which are stated to have good physical properties and being free of scorching in thicknesses up to at least two inches. These foams are prepared by curing an epoxy resin with an amine in the presence of a phenolic promoter while expanding with a volatile agent.

U.S. Pat. No. 4,281,069, relates to a phenolic foam produced without the use of a conventional chlorofluorocarbon or hydrocarbon blowing agent. The phenolic foam is produced as the reaction product of a mixture comprising a phenolic resole, a surfactant and stannic chloride.

U.S. Pat. No. 3,784,487 describes a process for making a foam from a composition comprising bituminous masses, a novolac, and hexamethylenetetramine.

Foaming of the mixtures which is brought about automatically by the gases set free and the hardening process with hexamethylenetetramine, may be caused by addition of propellants, e.g., azo-compounds, urea or he like.

U.S. Pat. No. 4,693,938 discloses a fuel capsule containing a rigid foam. Foams described therein include silica aerogels, and foams made from polyethylene gels. It is stated in this patent that the described foams have densities of about 50 mg/cm$^3$ and cell sizes of about 1 micron. These foams have certain deficiencies which make them unsuitable for use, however.

European Patent Application No. 0,060,138 discloses cross-linked polymeric materials of low density and high absorbency. The polymeric materials are made by preparing a water-in-oil high internal phase emulsion of a monomer, preferably styrene, a cross-linking agent, a free radical initiator and an emulsifying agent, then heating the emulsion until polymerization takes place.

Foams made in accordance with the process described in European Patent Application 0,060,138 have some characteristics which would make them suitable for use in the laser inertial confinement fusion process described herein. They are, for example, easily wet by liquid DT, and have excellent machinability, thus could be formed into spheres easily. The smallest cell diameter which can be achieved is 2-3 μm. However, the lowest density which can be achieved with this cell size is about 85 mg/cm$^3$. Thus, the foams are unsuitable for use because foams with both cell sizes no larger than about 1 μm and with densities less than about 50 mg/cm$^3$ are needed for successful nuclear fusion to be achieved in the process and apparatus described.

Some of the deficiencies of the foams produced in accordance with the process described in the European Patent Application are due to contaminates in the finished product. Typically, the surfactant residue (sorbitan monooleate and its hydrolysis product oleic acid) represents 18 percent of the foam mass, while the sodium hydrogen sulfate reaction product of the free radical initiator, sodium persulfate, represents another 12 percent of the foam mass. Moreover, on drying of the foam during the production thereof, the sodium hydrogen sulfate can concentrate at the drying surfaces, causing areas of density non-uniformity.

Clearly, the presence of such contaminants prohibits foams of optimum physical characteristics from being achieved.

What is needed in the art is a process for producing lower density, homogeneous and chemically pure foams.

This invention is concerned with such a process, with foams produced by the process, and with products made from the foam.

SUMMARY OF THE INVENTION

Figure 1:
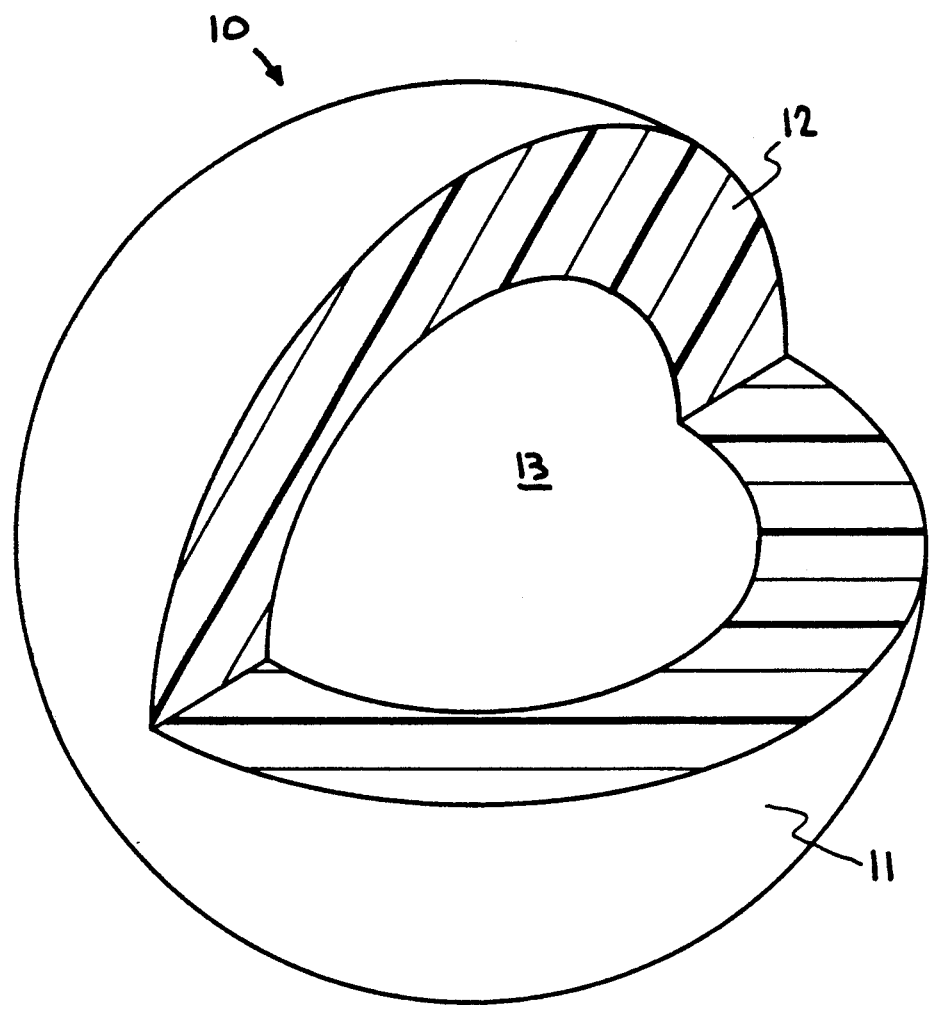
FIG. 1 is a perspective view, with portions cut away, of the fuel capsule of this invention.

It is an object of this invention to provide a spherical epoxy foam fuel container which is suitable for use as a target for a laser beam in a controlled nuclear fusion process.

It is also an object of the present invention to provide a porous epoxy foam material having a density less than about 50 mg/cm$^3$ and individual cells connected by pores in which the individual cells have diameters of no more than about 1 μm.

It is a further object of the invention to provide a process for making the above-described foam material.

Other objects and advantages of the invention will be apparent from the description to follow.

There are several aspects of the invention described herein.

In one aspect, the invention comprises a spherical fuel container consisting of a thin non-porous spherical shell surrounding a spherical shaped low density epoxy foam material having a hollow spherical core, wherein the foam has a density of less than about 50 mg/cm$^3$ and interconnecting individual cells with uniform diameters of no more than about 1 μm.

In another aspect, this invention comprises the foam material forming a part of the fuel container referred to above.

Yet another aspect of the invention comprises a process for making the epoxy foam material. The process comprises the steps of:

(a) selecting a multifunctional epoxy oligomer resin;

(b) mixing the epoxy resin with a non-reactive diluent to form a resin-diluent mixture;

(c) forming a cross-linked epoxy gel containing an incorporated diluent by either homopolymerizing the resin-diluent mixture in the presence of a catalyst, or reacting the mixture with a cross-linking co-monomer;

(d) replacing the diluent in the gel with a solvent therefor;

(e) replacing the solvent with liquid carbon dioxide; and (f) vaporizing off the liquid carbon dioxide under supercritical conditions.

The aforedescribed process produces an epoxy foam material which has a density less than about 50 mg/cm$^3$ and interconnected cells with cell diameters of about 1 μm or less.

DETAILED DESCRIPTION

The foam material of this invention can be made only by the process described herein.

The first step is to obtain a multifunctional epoxy oligomer resin. By the term "multifunctional" is meant an oligomer with three or more reactive sites capable of cross-linking. This multifunctional epoxy resin is a poly epoxide, of the type represented by the general formula:

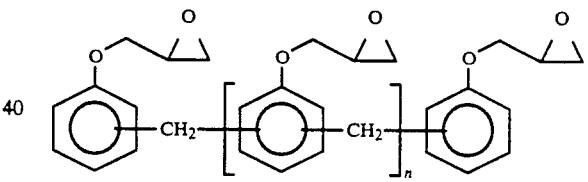

Where n is at least 1.

The epoxy compounds of the type described above are disclosed in U.S. Pat. No. 3,649,572, which is incorporated by reference herein for all legal purposes. Preferred poly epoxide resins are those selected from the group consisting of diglycidyl ethers of bisphenols and epoxy novolac resins. Especially preferred is a multifunctional epoxy oligomer sold under the tradename D.E.N. 485 by the Dow Chemical Company, Midland, Mich. This compound has the structure shown above and has a reported average degree of polymerization, n, of 3.5.

After the epoxy resin is obtained, a solution is prepared by dissolving the epoxy in a solvent/diluent, preferably chlorobenzene, in an amount such that the solids concentration ranges from 3 to 10 percent.

The resin can comprise from about 3 to about 15 percent by weight of the solution, preferably from about 3 to about 10 percent by weight, and more preferably from about 3 to about 6 percent by weight.

The diluent is desired to be non-reactive in the system, and high boiling (B.P. 100° C.). Preferred diluents for the homopolymerization reaction include chlorobenzene and dimethyl formamide.

Preferred diluents for the copolymerization reaction include, for example, benzyl alcohol, propylene carbonate, and benzyl ether.

Alcoholic solvents, like benzyl alcohol, cannot be used in the homopolymerization reaction because they react with epoxide under the catalytic action of tertiary amine.

After the resin-diluent mixture is prepared, it is homopolymerized in the presence of a tertiary amine catalyst, or copolymerized with a cross-linking co-monomer to form a cross-linked epoxy gel having the diluent incorporated therein.

Suitable cross-linking co-monomers include 4,4'-diaminodiphenylmethane, 4,4'-diaminodiphenylsulfsone, diethylenetriamine, and ethylenediamine. When 4,4'-diaminodiphenylmethane is used as the co-monomer, it can be used at levels ranging from about 10 to about 60 percent by weight relative to the epoxy polymer, preferably from about 15 to about 40 percent, and most preferably from 20 percent. The amine-to-epoxy ratio or co-monomer to epoxy resin ratio can range from about 0.3:1 to 2:1, preferably from about 0.3:1 to about 1.0:1, and most preferably about 0.3:1 to about 0.67:1. The essential characteristic of the cross-linking reaction is that it breaks the epoxide ring of the epoxy polymer, and links individual chains in the epoxy resin with other chains in the resin, to form more extensively cross-linked system.

Suitable tertiary amine catalysts or curing agents, as they are sometimes called, which may be employed herein to cause homopolymerization include, for example, aroalkyl polyamines such as benzyldimethylamine, or the polyalkylene polyamines such as 1,4-diazobicyclo [2.2.2] octane (also called triethylene diamine).

Especially preferred homopolymerization catalysts include benzyldimethylamine and 1,4-diazobicyclo [2.2.2.] octane.

Mixtures of any of the above-mentioned catalysts may be employed to produce the epoxy resin foams of the present invention.

The catalysts are present in an amount sufficient to cause homopolymerization of the epoxy resins, and cross-linking thereof.

Preferably, the catalysts are employed at relative mole ratios ranging from 0.05 to 0.40, tertiary nitrogen to epoxide.

The gel time for the resin-diluent-co-monomer mixture will vary, depending upon the resin concentration, catalyst level and precise catalyst used.

Thus, for example, at 100 degrees centigrade, the gel time for a resin-diluent mixture containing benzyldimethylamine cross-linking catalyst ranges from hours to days, while the gel time for a mixture containing 1,4-diazobicyclo [2.2.2.] octane cross-linking catalyst ranges from minutes to hours.

In a preferred embodiment, well mixed solutions of epoxy, diluent, co-monomer or catalyst are poured into capped vials and heated to 100° C. The vials are removed only when there is no apparent change in the stiffness of the gel.

The gel which is produced has an opaque, white appearance which is translucent at resin concentrations below 5 percent (w/v).

The macroporous epoxy "gel" is believed to be a phase separated system, occurring as microsyneresis (the diluent separates as small droplets inside the polymer). The polymer phase is highly cross-linked and is, therefore, insensitive to subsequent solvent exchanges with solvents of varying solvating power.

After the gel is formed, the gel diluent is ultimately replaced with liquid $CO_2$ and subjected to super critical drying to form the foam. This procedure usually involves a preliminary solvent exchange, typically placing the gel in a solvent bath, preferably acetone, and keeping it there until the solvent dissolves the diluent and replaces it in the gel. The bath is replenished regularly to insure fresh solvent at all times. Any solvent can be used which is a solvent for the diluent, but does not harm the polymer. Suitable solvents, in addition to acetone, include toluene, methanol, and amyl acetate. In general, the solvent must be soluble in liquid $CO_2$, non-damaging to the polymer and vehicle, and non-toxic.

After it is determined that the solvent has replaced the diluent, the solvent itself is replaced by liquid carbon dioxide. This procedure involves placing the gel inside a jacketed pressure vessel (Polaron Equipment Ltd., Watford, UK). The pressure vessel is filled with liquified $CO_2$ at 14 degrees centigrade and 900 psi. The pressure vessel is purged with clean $CO_2$ as often as necessary to completely extract the solvent from the gel.

After complete exchange, the vessel containing the gel is heated to approximately 15° C. above the critical temperature of $CO_2$ (31° C.) and held at that temperature for a minimum of 4 hours.

Pressure is maintained below 1300 psi by means of a pressure relief valve.

Dry foams are recovered at the elevated temperature by slowly releasing the supercritical $CO_2$ as a gas through an exit valve.

The dry epoxy foam which is obtained is characterized by low density, and individual cell sizes of about 1 $\mu m$ diameter. The cells are microcellular, and open.

The density of the resultant foam is governed by the solids concentration of the precursor gel. That is, the higher concentration of diluent in the precursor gel, the lower the density of the resulting foam will be. Concentrations of solids greater than about 15 percent are undesirable, however, because of a deleterious effect in structural integrity of the foam.

The foam produced in accordance with the process of this invention is soft, but self-supporting. Using specialized machining equipment, it can be machined. It can thus be crafted into the desired configuration.

If desired, the foam can be post cured by heating it at an elevated temperature for a period of time. Extended heat at 150°–200° C. improves the stiffness of the foam.

A fuel container which can be used as a target in a laser inertial confinement fusion process made from the foam of this invention, is shown in FIG. 1. The fuel container 10 comprises a non-porous thin spherical shaped protective membrane 11 or shell surrounding a spherical shaped open celled epoxy foam mass 12, having a spherical shaped hollow core 13.

The membrane 11 is formed on the outside of the foam mass by dipping or coating the mass 12 with a solution of polyvinyl alcohol or other thermoplastic polymer, such as polyethylene or polypropylene, and then letting the polymer solidify. The membrane 11 serves to prevent vapor escaping from fuel contained in the foam.

Fuel, in the form of a liquid deuterium-tritium mixture maintained at about 20° K., is inserted into the foam 12, occupying its cells. The hollow core 13 serves as a region to which fuel vapor escapes, serving as a spark plug when compressed by implosion of the fuel caused by a plasma envelope forming on the surface of the fuel mixture or ignition. The container 10 is positioned in the path of a laser beam to ignite, thereby causing a thermonuclear burn.

Other applications for the foams of this invention include their use as separation media, sound barriers, and thermal insulation.

Figure 2:
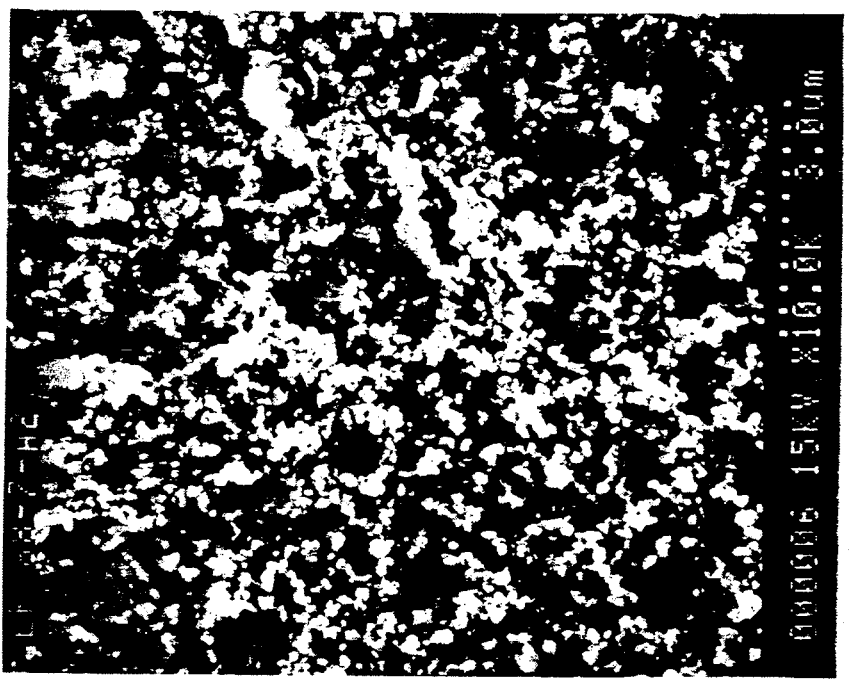

FIGS. 2-8 are micrographs of foams which have been produced in accordance with the process of this invention, as exemplified in the Examples set forth below. The specifics of the foam shown in each micrograph are as follows:

FIG. 2. This is an SEM (scanning electron micrograph) of 0.113 g/cc epoxy foam at 10,000× (gold coated). The foam is derived from a gel made by homopolymerizing 10% solids solution of D.E.N. 485 resin in a chlorobenzene solution. The catalyst, benzyldimethylamine, is employed at an [R$_3$N]/[Epoxide] ratio of 0.10/1.

Figure 3:
FIGS. 2-8 are micrographs of the foam material produced by the process of the invention.

FIG. 3. This is an SEM of 0.0423 g/cc epoxy foam at 1,000× (carbon coated). The foam is derived from a gel made by homopolymerizing 5% solids solution of D.E.N. 485 resin in a chlorobenzene solution. The catalyst, benzyldimethylamine, is employed at an [R$_3$N]/[Epoxide] ratio of 0.10/1.

Figure 4:
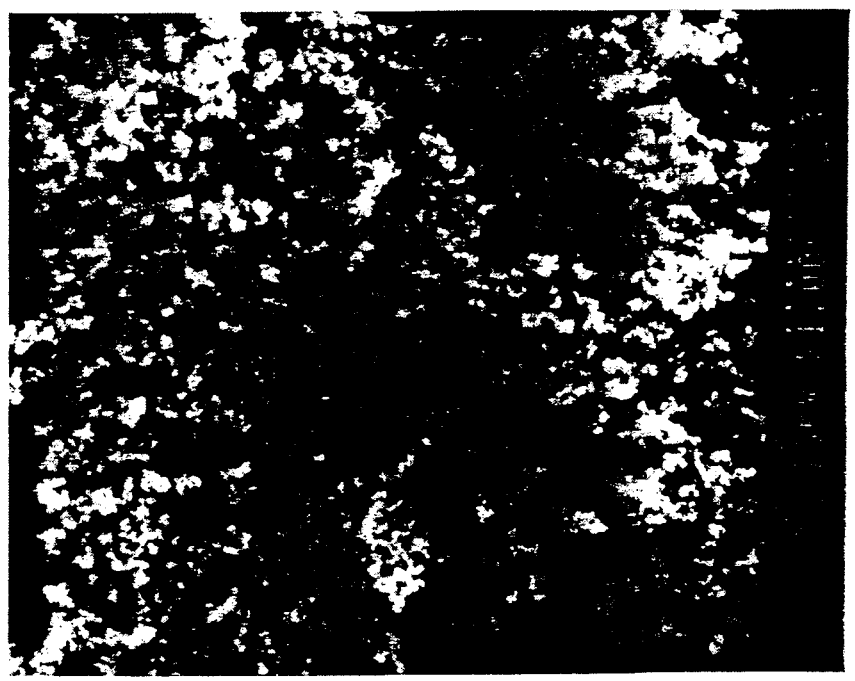

FIG. 4. This is an SEM of 0.0472 g/cc epoxy foam at 1,000× (carbon coated). The foam is derived from a gel made by homopolymerizing a 5% solids solution of D.E.N. 485 resin in a chlorobenzene solution. The catalyst, benzyldimethylamine, is employed at an [R$_3$N]/[Epoxide] ratio of 0.20/1.

Figure 5:
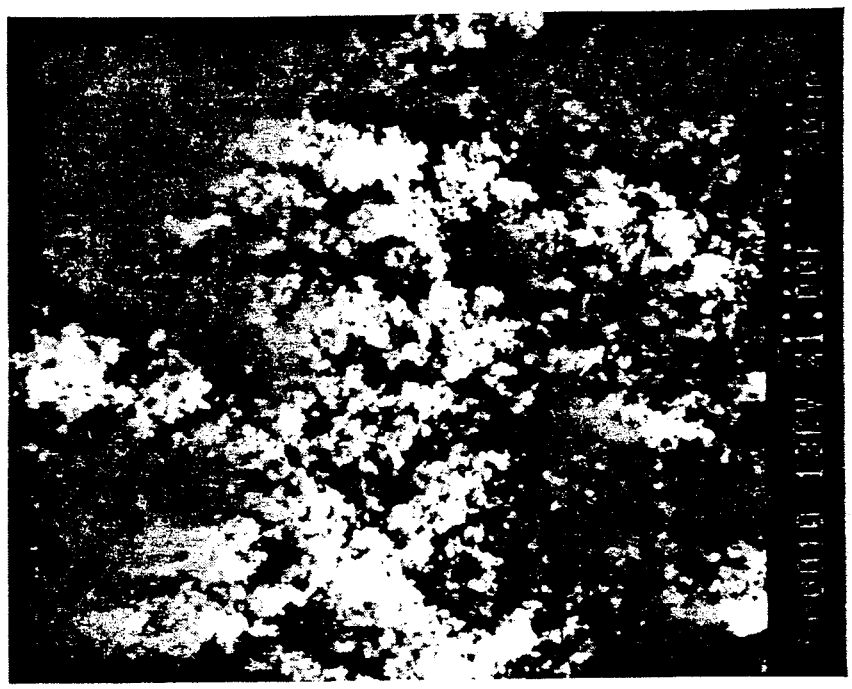

FIG. 5. This is an SEM of 0.0496 g/cc epoxy foam at 1,000+ (carbon coated). The foam is derived from a gel made by homopolymerizing a 5% solids solution of D.E.N. 485 resin in a chlorobenzene solution. The catalyst, benzyldimethylamine, is employed at a [R$_3$N]/[Epoxide] ratio of 0.40/1.

Figure 6:
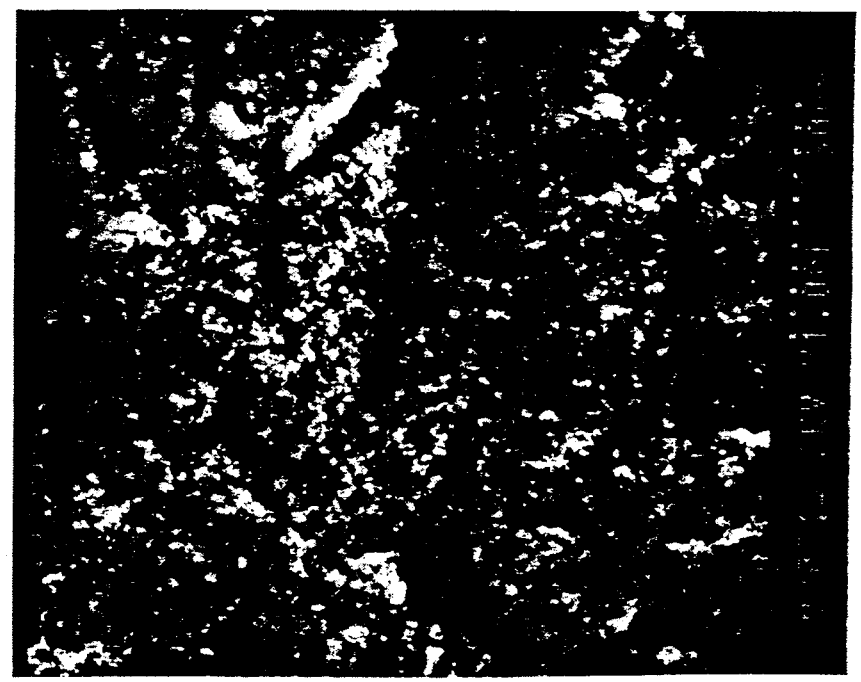

FIG. 6. This is an SEM of epoxy foam at 1,000× (carbon coated). The foam is derived from gel a made by homopolymerizing a 5% solids solution of D.E.N. 485 resin in a chlorobenzene solution. The catalyst, 1,4-diazobicyclo[2.2.2]octane, is employed at a [R$_3$N]/[Epoxide] ratio of 0.05/1.

Figure 7:
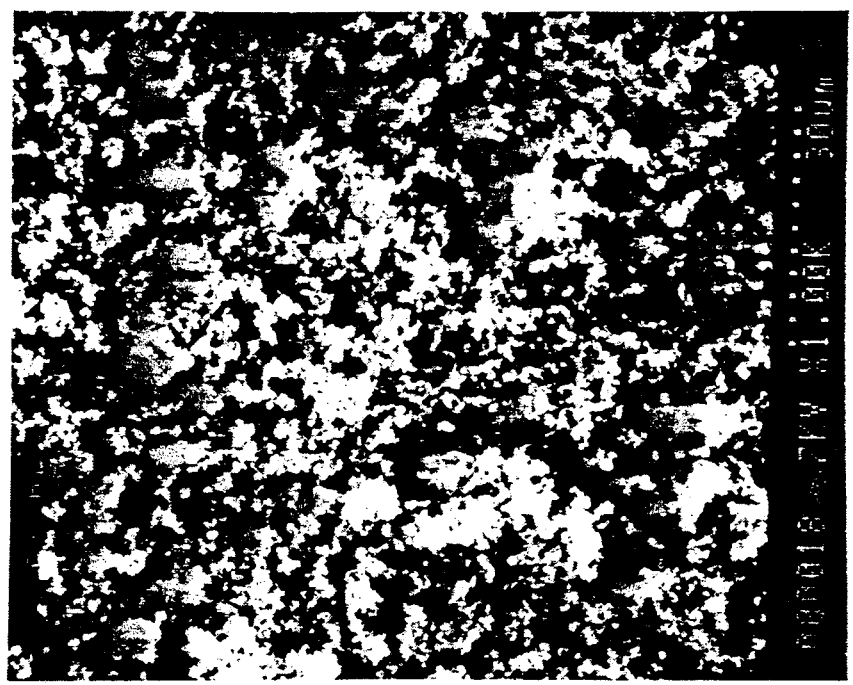

FIG. 7. This is an SEM of 0.0543 g/cc epoxy foam at 1,000× (carbon coated). The foam is derived from a gel made by homopolymerizing a 5% solids solution of D.E.N. 485 resin in a chlorobenzene solution. The catalyst, 1,4-diazobicyclo[2.2.2] octane, is employed at a [R$_3$N]/[Epoxide] ratio of 0.10/1.

Figure 8:
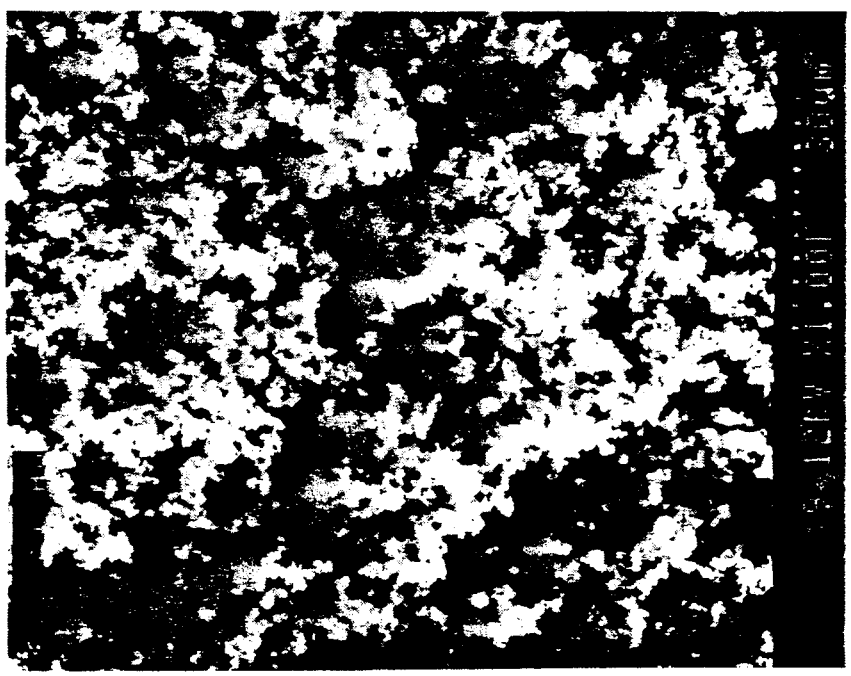

FIG. 8. The is an SEM of 0.0573 g/cc epoxy foam at 1,000× (carbon coated). The foam is derived from a gel made by homopolymerizing a 5% solids solution of D.E.N. 485 resin in chlorobenzene solution. The catalyst, 1,4-diazobicyclo[2.2.2] octane, is employed at [R$_3$N]/[Epoxide] ratio of 0.40/1.

The advantages of the process of this invention and the foam produced thereby can be seen in the following examples which are intended to be illustrative of the invention, but not limiting thereof.

EXAMPLE 1

Two 10% stock solutions of D.E.N. 485 resin (EEW=181.45) are prepared in pure chlorobenzene and pure benzyl alcohol. A series of 10 ml samples are prepared in covered glass vials by mixing the two stock solutions over a range of volumetric ratios: 10/0, 9/1, 8/2, 7/3, 5/5, and 0/10. Based on 100 parts of dissolved resin, 30 parts of 4,4'-methylenedianiline (MDA) is stirred into each sample (at 20°-25° C.) until completely dissolved. To initiate polymerization, the vials are placed in a circulating air oven and heated to 150° C. for 4 hours, then at 100° C. for an additional 15 hours.

Changes in appearance are noted soon after heating. The samples with more than 20% benzyl alcohol react the fastest, gelling in 1-3 hours. The other samples gel well after the temperature was reduced to 100° C. Benzyl alcohol is believed to serve as a catalyst for the epoxy-amine reaction.

At the end of the heating period, the samples are pulled from the oven, cooled to room temperature, and observed. The observations are set forth in Table I below:

TABLE I

| Sample | Volumetric Ratio Chlorobenzene/ Benzyl Alcohol | Description |
|---|---|---|
| 1. | 10/0 | Coarse, porous precipitate (white) gelled into moderately firm continuous mass. |
| 2. | 9/1 | Mixed precipitate gel; part hard solid, part elastomeric. |
| 3. | 8/2 | Firm gel. Yellow-white color. Opaque, but homogeneous when viewed in transmitted light. |
| 4. | 7/3 | Firm gel, somewhat elastomeric. Yellow-white color. Translucent and homogeneous in transmitted light. |
| 5. | 5/5 | Very firm elastomer gel. Hazy, but transparent. |
| 6. | 0/10 | Very firm elastomer gel. Almost clear. |

An acetone solvent exchange is attempted with samples 3-6. Shrinkage and fracturing is significant in the samples with the higher benzyl alcohol concentrations (samples 5 and 6). The best sample is No. 3, which subsequently is supercritically dried after exchanging the acetone with liquid $CO_2$. The dry foam has a density of 0.21 g/cc, which represents an overall volume shrinkage of 50% (based on a target density, in the absence of shrinkage, of 0.010 g/cc for a 10% solids gel).

EXAMPLE 2

Two 5% stock solutions of D.E.N. 485 are prepared by diluting 10% stock solutions with pure chlorobenzene and benzyl alcohol. A series of 10 ml samples are prepared in covered glass vials by mixing the two stock solutions over a range of volumetric ratios: 10/0, 9/1, 8/2, 7/3, 5/5, and 0/10. Based on 100 parts of dissolved resin, 30 parts of MDA is stirred into each sample (at 20°-25° C.) until completely dissolved. To initiate polymerization the vials are placed in a circulating air oven and heated for 27 hours at 100° C.

Due to dilution and a lower initial cure temperature, changes in appearance are observed at much longer cure times than with the 10% solids samples in Example 1. About seven hours passes before cloudiness (suspended precipitates) is observed in samples 1 and 2. Samples 5 and 6 never show gel or precipitate formation (even with additional curing at 100° C. for another day).

At the end of the heating period, the samples are pulled from the oven, cooled to room temperature, and observed. The observations are set forth in Table II below.

TABLE II

| Sample | Volumetric Ratio Chlorobenzene/ Benzyl Alcohol | Description |
|---|---|---|
| 1. | 10/0 | Coarse, porous precipitate (white) gelled into a very weak continuous mass. |
| 2. | 9/1 | Very weak gel. Opaque. Sponge-like appearance when viewed with transmitted light. |
| 3. | 8/2 | Soft gel. Yellow-white color. Opaque, but homogeneous when viewed in transmitted light. |
| 4. | 7/3 | Soft gel (softer than Sample 3). Yellow-white color. Translucent and homogeneous in transmitted light. |
| 5. | 5/5 | No gel. No precipitate. |
| 6. | 0/10 | No gel. No precipitate. |

An acetone solvent exchange is performed on samples 3 and 4. Only a slight volumetric shrinkage is observed at this stage. Both samples are supercritically dried after exchanging the acetone with liquid $CO_2$. Sample 3 had a density of 0.088 g/cc and sample 4 a density 0.083 g/cc. The overall shrinkage for both samples is about 60% (based on a target density, in the absence of shrinkage, of 0.050 g/cc for a 5% solids gel).

In Examples 3-6 below, solutions of D.E.N. 485 epoxy novolac resin are gelled by homopolymerization via the addition of a tertiary amine catalyst. Two catalysts are illustrated: benzyldimethylamine (BDMA) and triethylenediamine (TEDA) (or 1,4-diazobicyclo[2.2.2]octane). Both are incorporated at concentrations that range from 0.05 to 0.40 relative mole ratio. i.e., $[R_3N]/[Epoxide]$. At equivalent concentrations, systems catalyzed with TEDA gel about ten times faster than those using BDMA.

Proposed reaction mechanisms suggest that a trace of active hydrogen may be necessary to initiate the tertiary amine catalysis. To test this, small quantities of n-amylalcohol are sometimes added to the resin solution. The final results show, however, that gels are obtained with and without the alcohol. It can be concluded that active hydrogen is available from other sources (trace contaminates in the reactants, contaminates adsorbed to the walls of the reaction vessels, etc.) and does not need to be added as a separate ingredient.

The resulting gels are translucent at concentrations around 4% solids, and opaque at higher levels. Viable gels apparently cannot be made at concentrations below 3% solids. The gels are largely unaffected by the solvent exchanges that precede supercritical extraction in liquid carbon dioxide. The overall volume loss during processing to a dry foam ranges from a few percent to near 20%, with an average value around 15% (a much lower value than observed with epoxy-amine copolymer gels in Examples 1 & 2).

EXAMPLE 3

Into screw-capped glass vials are added 10 ml of a 10% (w/v) solution of D.E.N. 485 resin in chlorobenzene, 92 µl of BDMA, and 140 µl of n-amylalcohol (n-AmOH). The relative mole ratios of these ingredients, normalized to the epoxide is 1.0/0.11/0.23 ([Epoxide]/$[R_3N]$/[OH]).

Example calculations:

$$[Epoxide] = \text{Solution Volume} \times \text{Concentration} \times$$
$$(1/\text{Epoxide equivalent weight})$$
$$= 10 \text{ ml} \times \frac{10 \text{ g Resin}}{100 \text{ ml sol'n}} \times \frac{1000 \text{ mmol epoxide}}{181 \text{ g Resin}} =$$
$$5.52 \text{ mmol}$$

$$[R_3N] = \text{BDMA Volume} \times \text{Density} \times (1/\text{Molecular weight})$$
$$= 92 \text{ µl} \times \frac{0.915 \text{ g}}{1000 \text{ µl}} \times \frac{1000 \text{ mol } R_3N}{135.21 \text{ g}} =$$
$$0.62 \text{ mmol}$$

$$[ROH] = \text{n-AmOH Volume} \times \text{Density} \times (1/MW)$$
$$= 140 \text{ µl} \times \frac{0.81 \text{ g}}{1000 \text{ µl}} \times \frac{1000 \text{ mmol ROH}}{88.15 \text{ g}} =$$
$$1.29 \text{ mmol}$$

The vials are placed in an oven at 80° C. After about 12 hours, no change is observed, so the temperature is increased to 100° C. After 24 hours, the solutions start to take on a hazy appearance. After 32 hours they are more hazy and are starting to gel. The vials are removed from the oven 44 hours later. The total time at 100° C. is 76 hours. At room temperature, the gels are white and opaque.

Two gels are removed from the glass vials by carefully breaking away the glass. They are extracted first with acetone to remove chlorobenzene, then with liquid $CO_2$ to replace the acetone. Finally, they are supercritically dried in a pressure vessel by heating to a temperature of 46° C. for a period of 4 hours.

The resulting dry foams have densities of 0.113 and 0.104 g/cc suggesting an apparent overall shrinkage of 13% and 4% (versus a target density of 0.10 g/cc). SEM (scanning electron microscope) micrographs reveal that the foam morphology is highly ramified and porous, as seen in FIG. 2. The average cell diameter (pore volume is on the order of 1 µm.

EXAMPLE 4

Into six screw-capped glass vials are added 10 ml of a 5% (w/v) solution of D.E.N. 485 resin in chlorobenzene, 15 µl of n-amyl alcohol, and 41, 61, 82, 102, 122 and 163 µl of BDMA. The relative mole ratios of these ingredients are shown in Table III below.

TABLE III

| Sample | [Epoxide]/$[R_3N]$/[OH] |
|---|---|
| 1 | 1.00/0.10/0.05 |
| 2 | 1.00/0.15/0.05 |
| 3 | 1.00/0.20/0.05 |
| 4 | 1.00/0.25/0.05 |
| 5 | 1.00/0.30/0.05 |
| 6 | 1.00/0.40/0.05 |

The vials are placed in an oven at 100° C. The gel times are observed to rank with the catalyst concentration asset forth in Table IV below.

TABLE IV

| Sample | Gel time at 100° C. |
|---|---|
| 1 | Around 60 hours |
| 2 | 36–47 hours |
| 3 | 36–47 hours |
| 4 | 24 hours |
| 5 | Less than 20 hours |

TABLE IV-continued

| Sample | Gel time at 100° C. |
|--------|---------------------|
| 6 | Less than 20 hours |

The vials are removed from the oven after 78 hours at 100° C. At room temperature the gels are white and opaque. When removed from the vials, they are very soft, but self-supporting. The gels are extracted with acetone to remove chlorobenzene, then with liquid $CO_2$ to replace the acetone. Finally, they are supercritically dried.

The densities and surface areas of the resulting dry foams are set forth in Table V.

TABLE V

| Sample | Density (g/cc) | Surface* Area ($m^2/g$) |
|--------|----------------|-------------------------|
| 1 | 0.0423 | 102 |
| 2 | 0.0443 | — |
| 3 | 0.0472 | 139 |
| 4 | 0.0460 | — |
| 5 | 0.0474 | — |
| 6 | 0.0496 | 112 |

*Determined by BET Method (Brunauer, Emett and Teller)

Since the target density using a 5% solution is 0.050 g/cc, it first appears that the foams may have expanded in volume during the drying process. It is more likely, though, that some of the mass was washed away during the extractions. This mass may be unreacted resin or material that was only weakly attached to the gel network.

SEM micrographs, FIGS. 3, 4, and 5, of the foams show a highly ramified and porous morphology that is more open than the 0.01 g/cc foams prepared in Example 3. The average cell (or pore) diameter appears to be on the order of 5 μm. There appears to be no significant influence by the BDMA concentration o the SEM morphology.

EXAMPLE 5

Into eight screw-capped glass vials are added 10 ml of a 5% (w/v) solution of D.E.N. 485 resin in chlorobenzene, 15 μl of n-amyl alcohol, and 8, 16, 23, 31, 39, 46, 54, and 62 μl of TEDA. The relative mole ratios of these ingredients are set forth in Table VI.

TABLE VI

| Sample | [Epoxide]/[R$_3$N]/[OH] |
|--------|-------------------------|
| 1 | 1.00/0.05/0.05 |
| 2 | 1.00/0.10/0.05 |
| 3 | 1.00/0.15/0.05 |
| 4 | 1.00/0.20/0.05 |
| 5 | 1.00/0.25/0.05 |
| 6 | 1.00/0.30/0.05 |
| 7 | 1.00/0.35/0.05 |
| 8 | 1.00/0.40/0.05 |

Example calculations:

$$[\text{Epoxide}] = 10 \text{ cc} \times \frac{5 \text{ g Resin}}{100 \text{ cc sol'n}} \times \frac{1000 \text{ mmol epoxide}}{181 \text{ g Resin}} = 2.76 \text{ mmol}$$

$$[\text{ROH}] = 15 \text{ μl} \times \frac{0.81 \text{ g}}{1000 \text{ μl}} \times \frac{1000 \text{ mmol ROH}}{88.15 \text{ g}} = 0.14 \text{ mmol}$$

$$[R_3N] = 0.008 \text{ g} \times \frac{2000 \text{ mmol } R_3N}{112.18 \text{ g}} = 0.14 \text{ mmol}$$

The vials are placed in an oven at 100° C. and left there for 78 hours. The gel times rank with the catalyst concentration as follows:

| Sample | Gel time at 100° C. |
|--------|---------------------|
| 1 | Around 36 hours |
| 2 | Less than 3 hours |
| 3–8 | Less than 2 hours |

The gels are removed from the vials by carefully breaking away the glass. With the exception of Sample 1, the gels are firm and fairly robust; they are stronger than the 5% solids BDMA catalyzed foams in Example 4. Sample 1 gel is very soft and not self-supporting; it breaks during removal from the vial. The gels are extracted first with acetone to remove chlorobenzene, then with liquid $CO_2$ to replace the acetone. Finally, they are supercritically dried. The densities and BET surface areas of the dry foams are:

| Sample | [Epoxy]/[R$_3$N] | Density (g/cc) | Surface Area ($M^2/g$) |
|--------|------------------|----------------|------------------------|
| 1 | 1.00/0.05 | — | 298 |
| 2 | 1.00/0.10 | 0.0543 | 255 |
| 3 | 1.00/0.15 | 0.0530 | 220 |
| 4 | 1.00/0.20 | 0.0575 | 164 |
| 5 | 1.00/0.25 | 0.0572 | — |
| 6 | 1.00/0.30 | 0.0582 | — |
| 7 | 1.00/0.35 | 0.0576 | 129 |
| 8 | 1.00/0.40 | 0.0573 | 116 |

Unlike the BDMA catalyzed gels in Example 4, the gels show no evidence of a mass loss during extraction. Overall, a small volumetric shrinkage of 9 to 16% is indicated. SEM micrographs of the foams (FIGS. 6, 7, and show a highly ramified and porous morphology. Finer morphology foams are formed at lower catalyst concentration.

EXAMPLE 6

Eight samples of D.E.N. 485 resin in chlorobenzene are prepared in screw-capped glass vials at eight concentrations ranging from 3.0 to 8.0% solids. TEDA is added to each solution to yield a constant normalized mole ratio [Epoxide]/[R$_3$N]=1.00/0.20. No n-amyl alcohol is added.

The vials are placed in an oven at 100° C. and observed. The gel times rank with the resin concentration as set forth in TABLE VII below.

TABLE VII

| Sample | Resin Conc. (% solids) | Gel time at 100° C. |
|--------|------------------------|---------------------|
| 1 | 3.0 | <117 minutes |
| 2 | 3.5 | <117 minutes |
| 3 | 4.0 | <88 minutes |
| 4 | 4.5 | <80 minutes |
| 5 | 5.0 | <80 minutes |
| 6 | 6.0 | <59 minutes |
| 7 | 7.0 | <59 minutes |
| 8 | 8.0 | <44 minutes |

After 7.2 hours at 100° C., the temperature is increased to 120° C. and the samples are heated for an additional 15.5 hours. At termination of this heating period, the vials are cooled to room temperature and the gels are removed by carefully breaking away the glass. With the exception of Samples 1 and 2, the gels are firm, robust, and homogeneous when viewed in transmitted light. Samples 1 and 2 have a granular appearance, 1 more so than 2. Samples 1 and 2 also exhibit some syneresis (a layer of clear solvent on top of the gel).

The gels are extracted with acetone to remove chlorobenzene, then with liquid $CO_2$ to replace the acetone. Finally, they are supercritically dried. The properties of the dry foams are as set forth in Table VIII below.

TABLE VIII

| Sample | Resin Conc. (% solids) | Density (g/cc) | Shrinkage (%) | Surface Area (m²/g) |
|---|---|---|---|---|
| 1 | 3.0 | 0.0339 | 13 | 128 |
| 2 | 3.5 | 0.0384 | 10 | — |
| 3 | 4.0 | 0.0438 | 10 | — |
| 4 | 4.5 | 0.0480 | 7 | 137 |
| 5 | 5.0 | 0.0569 | 14 | — |
| 6 | 6.0 | 0.0711 | 18 | 161 |
| 7 | 7.0 | 0.0820 | 17 | — |
| 8 | 8.0 | 0.0953 | 19 | 183 |

The foregoing description of preferred embodiments of the invention has been presented for purposes of illustration and description. It is not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

I claim:

1. A process for preparing low density foam material which comprises:
   (a) mixing a multifunctional epoxy oligomer resin with a non-reactive diluent to form a resin-diluent mixture;
   (b) forming a diluent containing cross-linked epoxy gel from said resin-diluent mixture;
   (c) replacing said diluent with a solvent therefore;
   (d) replacing said solvent with liquid carbon dioxide; and
   (e) vaporizing off said liquid carbon dioxide under supercritical conditions, whereby a foam having a density in the range of 35–150 mg/cc and cell diameters less than about 1 μm is produced.

2. The process of claim 1 wherein said diluent containing cross-linked epoxy gel is formed by cross-linking said resin-diluent mixture with a co-monomer.

3. The process of claim 1 wherein said diluent containing cross-linked epoxy gel is formed by homopolymerizing said resin-diluent mixture in the presence of a catalyst.

4. The process of claim 1 wherein said epoxy polymer has the formula:

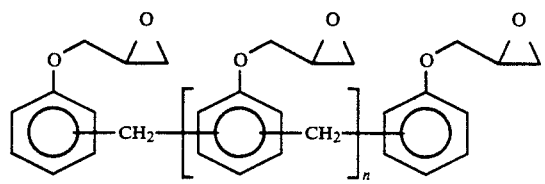

wherein n is at least 1.

5. The process of claim 1 wherein said non-reactive diluent is selected from the group consisting of chlorobenzene, dimethyl formamide, benzyl alcohol and mixtures thereof.

6. The process of claim 3 wherein said catalyst is a tertiary amine.

7. The process of claim 1 wherein said carbon dioxide is vaporized by heating said gel in a pressure vessel to a temperature above 31° C.

8. The process of claim 6 wherein said catalyst is benzyldimethylmine or 1,4-diazobycyclo[2.2.2]octane.

9. The process of claim 1 wherein said cross-linking co-monomer is 4,4'-diaminophenylmethane.

10. The process of claim 1 wherein said epoxy polymer of (c) is subject to a solvent exchange in a solvent therefor.

11. The process of claim 10 wherein said solvent is acetone.

12. The process of claim 1 wherein said liquid carbon dioxide is maintained under pressure at 14° C. and 900 psi.

13. The process of claim 1 wherein after step (e) the foam produced is further post-cured at elevated temperatures.

* * * * *